April 26, 1966  W. D. CRAGG  3,247,927
ELECTRO-ACOUSTIC TRANSDUCERS
Filed July 27, 1961

Inventor
WILLIAM DONALD CRAGG
By Philip M. Bolton
Attorney

United States Patent Office 3,247,927
Patented Apr. 26, 1966

3,247,927
ELECTRO-ACOUSTIC TRANSDUCERS
William Donald Cragg, London, England, assignor to International Standard Electric Corporation, New York, N.Y., a corporation of Delaware
Filed July 27, 1961, Ser. No. 127,255
Claims priority, application Great Britain, July 29, 1960, 26,431/60
11 Claims. (Cl. 181—32)

This invention relates to diaphragms for use in electro-acoustic transducers.

An object of the invention is to provide a flat membrane diaphragm having a high compliance characteristic. A further object of the invention is to simplify the production of such diaphragms, particularly for application to pressure-gradient condenser microphones and moving coil microphones.

According therefore to the invention, there is provided laminated material for use as the membrane diaphragm of an electro-acoustic transducer, which comprises a thin sheet (i.e. less than about 0.002" or 0.05 mm.) of heat-shrinkable thermo-plastic material, pre-streched uniformly in at least two directions under heat and subsequently set without release of the strain thereby established in the material ("the first heat treatment"), the material being then coated intimately and uniformly on one surface with a continuous film of metal, substantially thinner than the said thin sheet, the said sheet so prepared being then subjected to a second heat treatment ("annealing") so as to release at least some of the residual strain in the material after the first heat treatment, whereby a reticulated pattern of microscopic corrugations and waves is imparted to the laminate.

Also according to the invention there is provided a method of manufacturing laminated material for use as the diaphragm of an electro-acoustic transducer which includes the steps of (a) tensioning a sheet of heat-shrinkable thermo-plastic material, to two-to-three times its original area while under heat at a temperature between about 150° and 200° C., the tensioning being effected in at least two directions and the thickness after tensioning not exceeding about 0.002 inch (0.050 mm.); (b) coating the sheet with a thin layer of metal by a deposition process (the layer being substantially thinner than the tensioned sheet); (c) annealing the tensioned sheet while mounted between glass plates at a temperature between about 150° C. and 170° C. until a shrinkage of 10 to 20 percent has been effected; (d) selecting an area of the annealed sheet for use as a diaphragm and stretching it lightly over a ring support to remove residual waviness resulting from the annealing process; and (e) heating the stretched area again to about 150° C. allowing to cool while under tension.

The invention also comprises diaphragms for transducers made from such material.

An embodiment of the invention will now be described with reference to the accompanying drawings in which.

The use of a flat sheet dielectric for membrane diaphragms introduces the problem of obtaining flatness during manufacture and a sufficiently high compliance characteristic in operation.

Figure 1A:
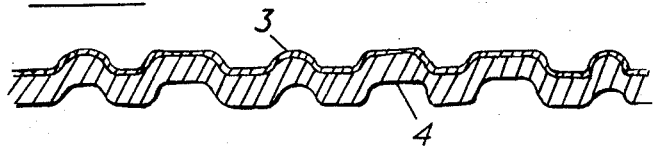
FIGS. 1a and 1b are sections through a corrugated surface. These illustrations are intended only to facilitate a definition of flatness appearing in the description.
Figure 1B:
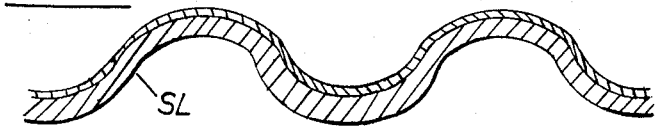
Figure 3:
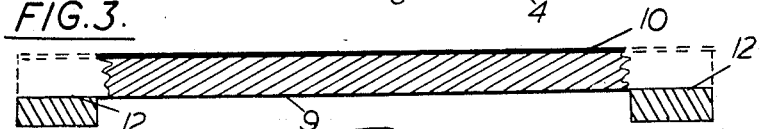
FIG. 3 illustrates the construction of a plane diaphragm of known type.

It should be noted that where reference is made in the specification to flatness, the term is intended to mean flatness of the diaphragm in one plane within limits which are comparable to the thickness of the material from which it is constructed. For instance, the diaphragm membrane shown in FIG. 3 is perfectly flat since the surfaces indicated at 9 and 10 are flat and parallel within 10 microns; the sheet of FIG. 1a is also regarded as flat because the corrugations are not greater than the thickness, but the sheet of FIG. 1b is not flat because the wave amplitude is many times the thickness.

Figure 2:
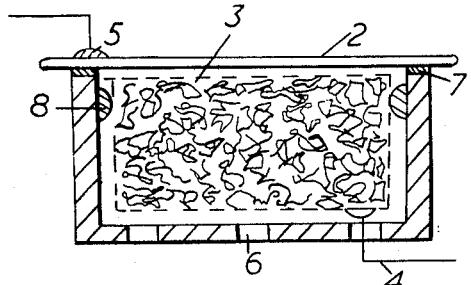
FIG. 2 is a sectional elevation through a known form of condenser microphone.

A pressure gradient condenser microphone of known design is illustrated at FIG. 2. A metal container 1 with numerous holes 6 in the base, houses a porous mass 3 of granular material having a high insulation resistance and held in position by a number of blobs 8 of suitable adhesive such as Araldite, a condensation product of poly-arylepoxyethane compounds. The upper surface of the mass 3 is ground to flatness and a plastic sheet diaphragm 2 is stretched and attached to the metal case with a thickness of adhesive 7 to give a spacing of about 1 to 2 mils (1 mil=0.001 inch or 0.0254 mm.) (or even less) between the diaphragm and the top surface of the body 3. Electrically conducting coatings are applied to the top surface of the body 3 and the outer surface of the diaphragm 2. Electric connections 4 and 5 are connected to the conducting layers by attaching wires to convenient points by a conducting adhesive. The electric coating, in the case of the body 3, extends from the top surface round the edge of the body to the point of attachment of lead 4. The outside dimensions are usually in the range ½ to 1 inch wide x ½ to 1 inch long x 0.1 inch thick.

This type of microphone is a pressure-gradient device and in order to obtain a flat response the acoustic reactive impedance of the membrane diaphragm must be smaller than the resistive impedance of the porous body 3 (FIG. 2) at the lowest transmission frequency. In practice, the compliance of the membrane must be as high as can be achieved to obtain a good bass response and high sensitivity. This is explained in greater detail in Great Britain patent application No. 38,787/58, now Great Britain Patent No. 881,584.

The problem to be overcome during manufacture of such a microphone is that for the diaphragm 2 to be flat after mounting it must be stretched evenly and to a degree just sufficient to eliminate slackness. Owing to the inherent stiffness of the diaphragm under tension slightly uneven stretching for different radial directions can give rise to puckering of the surface. Such an assembly operation is therefore both complicated and exacting. Furthermore the performance of such a diaphragm is not altogether satisfactory because deflection of the sheet 2 from the mean position requires longitudinal extension of the material which results in low compliance. If, however, a minute corrugation is introduced into the material then small radial extensions of the membrane are possible with only slight longitudinal extension of the material and the compliance of the sheet will be many times higher.

FIG. 3 illustrates a portion of a prepared diaphragm of a known type in which a plastic sheet 9 has been treated with an electrically conducting coating 10 to produce a flat laminate. The laminated sheet is stretched over a mounting ring 11 and secured with adhesive between the contact surfaces 12 to facilitate subsequent assembly of the microphone. Such a construction may be used, in accordance with the method shortly to be described, in the manufacture of a corrugated diaphragm.

The required corrugated formation can be obtained by using any heat shrinkable thermo-plastic as the diaphragm material; in the preferred embodiment polyethylene terephthalate in sheet form was found to be a suitable material for this purpose. Such a sheet is normally available in a two-way pre-stretched condition, i.e. as part of its manufacturing process it is stretched in at least two directions at a relatively high temperature to several times its original area and then heat-set under tension at 200° C. ("First heat treatment.") This imparts exceptional tensile strength and it is temperature-stable up to 150° C. However, if heated above 150° C. in an annealing process, the material will shrink and tend to revert to its original state. ("Second heat treatment.")

Figure 4:
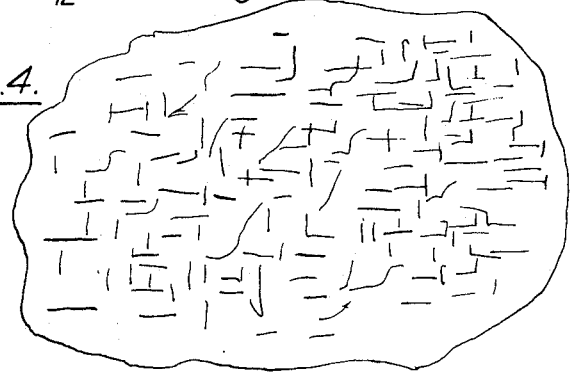
FIG. 4 is a plan view of a section of diaphragm material according to the invention.

The two-way stretched plastic sheet can be coated intimately, e.g. by vacuum deposition, with a metallic conducting layer such as aluminium, tin, zinc, cadmium (to quote a few examples), without affecting its physical condition, and if such a metallized film is annealed at 150° C.–170° C. the plastic will shrink but the metal coating will not. During such a heating process the film is preferably confined between glass sheets to prevent it rolling itself into a coiled cylinder. The ensuing differential contraction forces the laminate into a reticulated pattern of microscopic corrugations such as illustrated in FIG. 4 (plan) and FIG. 1a (section). Sheets of the thinness required (¼, ½ and 1 mil) have been found not to be flat enough for immediate use as membrane diaphragms owing to the surface of the sheet being broken by microscopic waves. However, the heat setting properties of the plastic sheet can be brought into use again. The small area which is to be used can be radially stretched by 2–3% of its size, heated in the range of 150°–190° C. for a short time and allowed to cool while still under tension. The slight stretching will pull flat the microscopic waves but will leave the microscopic corrugations unaffected, and heat setting under tension will stabilize this condition. ("Third heat treatment.")

The sheet, which at this stage is completely processed, can if required be fixed to a suitable mounting ring 11 (FIG. 3) for eventual assembly in the microphone, this operation being simplified owing to the radial elasticity provided by the corrugations facilitating the elimination of slackness, thereby reducing the extent to which the sheet needs to be stretched and in consequence reducing the risk of puckering.

In addition to the preceding advantages in the case of condenser microphones, such a diaphragm construction has a useful application to moving-coil microphones. The customary diaphragms in such microphones have a dome based on the coil, with corrugations, either tangential to the dome or concentric with it, between the dome and an outer seating flange. This is to enable the deflection of the diaphragm as a whole to be linear with applied pressure. The tangential corrugations are in effect stiff rods and confine the area available for flexibility to two narrow rings at their inner and outer extremities, while the concentric corrugations stiffen the material of the annulus between the dome and the mounting ring. The non-linear properties resulting from attempts to use flat sheet material in the annulus result from the fact that very small movements of the dome (as a whole) can be made without the need for radial extension of the supporting annulus, although larger movements need such extension. The stiffness for small movements is thus a bending stiffness and is low; for larger movements the material must be stretched longitudinally and the resulting stiffness is high. The use of heat-treated corrugated plastic laminate according to the invention for domed diaphragms obviates the need for special stiffening measures in the annulus, since by its use bending stiffness for all deflections is achieved and movement is thus linear and stiffness low.

Figure 5:
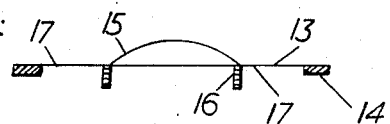
FIG. 5 is a schematic illustration of a domed diaphragm and coil arrangement for a moving coil microphone.

Referring now to FIG. 5 in which a moving coil microphone is schematically illustrated, a diaphragm 13, prepared in a manner according to the invention, is fixed with adhesive to a mounting ring 14 and has a dome 15 centrally positioned on the top face of the diaphragm. The dome may be provided by shaping the flat sheet by a known method, such as forming, in which case the corrugations in the surface of the dome would, in all probability be ironed out without, however, affecting the performance of the diaphragm. Alternatively, the dome may be made as a separate component and fixed to the diaphragm with adhesive. On the opposite face of the diaphragm 13 a speech coil 16 is positioned in axial alignment with the dome 15 and defines a supporting annulus 17 between the dome and mounting ring 14. Unlike conventional arrangements, neither the tangential nor concentric corrugations previously referred to are provided. The otherwise flat surface of the annulus is broken only by the minute processing corrugations previously described.

The invention has further advantage in its application to moving coil microphones. Owing to the low stiffness of the supporting annulus 17 (FIG. 5), the radial width of the annulus can be reduced as compared to that necessary when using tangential or concentric corrugations, thereby giving some increase in the electro-acoustic conversion efficiency of the diaphragm plus coil.

It may be noted that, for use in a moving coil diaphragm, the metallizing serves no electrical purpose; only the mechanical one herein described in the preparation of the sheet for use in a diaphragm.

While the preceding description has been concerned solely with diaphragms constructed according to the invention for use in individual microphones, the plastic sheet could be prepared in the form of an oblong strip and act as a single diaphragm for two or more microphones mounted in a column arrangement.

As a further application of the invention, the corrugated plastic sheet may be used in the construction of membrane diaphragms for electro-static loudspeaker units.

It is to be understood that the foregoing description of specific examples of this invention is not to be considered as a limitation on its scope.

What I claim is:

1. A metallically coated material for use as the membrane diaphragm of an electro-acoustic transducer comprising a thin sheet of heat-shrinkable thermo-plastic material prestretched uniformly in at least two directions under heat and set to maintain strains established in the material, and a metallic film intimately and uniformly coated on a surface of said material, said metallic film and said material having microscopic corrugations disposed therein due to the release of strains previously imparted to said thermo-plastic material.

2. A metallically coated material according to claim 1 wherein said metallic coated material is a substantially flat surface having said microscopic corrugations disposed therein.

3. A metallically coated material for use in electro-acoustic transducers according to claim 1 further comprising a convex dome positioned centrally in one face of said metallic coated material.

4. A metallically coated material for use in electro-acoustic transducer according to claim 1 further comprising a separate dome of thermo-setting plastic disposed centrally upon said metallic coated material, and adhesive means for attaching said dome to said metallic coated material.

5. A metallically coated material according to claim 1 wherein said thermo-plastic material is less than 0.002" in thickness.

6. A metallically coated material according to claim 1 wherein said metallic film is substantially thinner than said thermo-plastic material.

7. A method of manufacturing a metallically coated material for use as a diaphragm of an electro-acoustic transducer comprising the steps of tensioning a sheet of heat-shrinkable thermo-plastic material to 2 to 3 times its original area under heat at a temperature between 150° and 200° C., the tensioning being affected in at least two directions and the thickness after tensioning not exceeding 0.002", depositing a thin metallic layer on a surface of said sheet to a thickness substantially less than the thickness of said sheet after tensioning, annealing said metallized sheet at a temperature between 150° and 170° C. to cause a shrinkage of 10–20%, stretching a selected area of said annealed sheet to remove residual waviness therefrom and maintain residual corrugations therein, said waviness and said corrugations resulting from said annealing step, heating said stretched selected area to 150° C., and cooling said stretched selected area under tension.

8. A method according to claim 6 further including the step of molding a dome in the surface of said stretched area.

9. A method of manufacturing a metallically coated material for use as a diaphragm of an electro-acoustic transducer comprising the steps of tensioning a sheet of heat-shrinkable thermo-plastic material to 2 to 3 times its original area under heat at a temperature between 150° and 200° C., the tensioning being affected in at least two directions and the thickness after tensioning not exceeding 0.002", depositing a thin metallic layer on a surface of said sheet to a thickness substantially less than the thickness of said sheet after tensioning, mounting said metallized sheet between glass plates, annealing said metallized sheet at a temperature between 150° and 170° C. to cause a shrinkage of 10–20%, stretching a selected area of said annealed sheet to remove residual waviness therefrom and maintain residual corrugations therein, said waviness and and said corrugations resulting from said annealing step, heating said stretched selected area to 150° C., and cooling said stretched selected area under tension.

10. A method of manufacturing a metallically coated material for use as a diaphragm of an electro-acoustic transducer comprising the steps of depositing a thin metallic layer on a surface of a sheet of heat-shrinkable thermo-plastic material pre-stretched in at least two directions, said metallic layer having a thickness substantially less than the thickness of said sheet, annealing said metallized sheet at a temperature between 150° and 170° C. to cause a shrinkage of 10–20%, stretching a selected area of said annealed sheet to remove residual waviness therefrom and maintain residual corrugations therein, said waviness and said corrugations resulting from said annealing step, heating said stretched selected area to 150° C., and cooling said stretched selected area under tension.

11. A method of manufacturing metallically coated material for use as a diaphragm of an electro-acoustic transducer comprising the steps of depositing a thin metallic layer on a surface of a sheet of heat-shrinkable thermo-plastic material pre-stretched in at least two directions, said metallic layer having a thickness substantially less than the thickness of said sheet, mounting said metallized sheet between glass plates, annealing said metallized sheet at a temperature between 150° and 170° C. to cause a shrinkage of 10–20%, stretching a selected area of said annealed sheet to remove residual waviness therefrom and maintain residual corrugations therein, said waviness and said corrugations resulting from said annealing steps, heating said stretched selected area to 150° C., and cooling said stretched selected area under tension.

References Cited by the Examiner

UNITED STATES PATENTS

| | | | |
|---|---|---|---|
| 2,297,218 | 9/1942 | Henrich et al. | 181—32 |
| 2,740,732 | 4/1956 | Peck et al. | 117—227 |
| 2,836,528 | 5/1958 | Ford | 161—231 |
| 2,928,132 | 3/1960 | Richards | 18—48 |
| 2,968,583 | 1/1961 | Barth | 117—213 |
| 2,993,558 | 7/1961 | Reisz | 181—32 |
| 3,014,818 | 12/1961 | Campbell | 117—227 |
| 3,076,062 | 1/1963 | Fener | 179—119 |
| 3,076,520 | 2/1963 | Farwell | 181—31 |

EARL M. BERGERT, *Primary Examiner.*

R. I. SMITH, M. L. KATZ, *Assistant Examiners.*